(12) United States Patent
Yamamoto et al.

(10) Patent No.: US 9,813,697 B2
(45) Date of Patent: Nov. 7, 2017

(54) HEAD MOUNT DISPLAY AND DISPLAY CONTROL METHOD

(75) Inventors: Masaaki Yamamoto, Tokyo (JP); Masaomi Nabeta, Tokyo (JP); Naomasa Takahashi, Chiba (JP); Yohsuke Kaji, Chiba (JP); Yoichi Hirota, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 249 days.

(21) Appl. No.: 14/238,933

(22) PCT Filed: Aug. 17, 2012

(86) PCT No.: PCT/JP2012/005194
§ 371 (c)(1),
(2), (4) Date: Feb. 14, 2014

(87) PCT Pub. No.: WO2013/027380
PCT Pub. Date: Feb. 28, 2013

(65) Prior Publication Data
US 2014/0198193 A1    Jul. 17, 2014

(30) Foreign Application Priority Data
Aug. 24, 2011    (JP) .................................. 2011-182323

(51) Int. Cl.
*H04N 13/04*    (2006.01)
*G02B 27/01*    (2006.01)
(Continued)

(52) U.S. Cl.
CPC ......... *H04N 13/044* (2013.01); *G02B 27/017* (2013.01); *G09G 3/003* (2013.01);
(Continued)

(58) Field of Classification Search
CPC .... H04N 1/38; H04N 1/3935; H04N 1/00506; H04N 1/00509; H04N 1/00827;
(Continued)

(56) References Cited

U.S. PATENT DOCUMENTS 5,729,248 A * 3/1998 Hwang .............. H04N 5/44504
345/467
6,262,772 B1 * 7/2001 Shen .................... H04N 7/0122
348/173

(Continued)

FOREIGN PATENT DOCUMENTS

| JP | 2007-304318 A | 11/2007 |
| JP | 2009-134188 A | 6/2009 |
| JP | 2011-081178 A | 4/2011 |

*Primary Examiner* — Dramos I Kalapodas
(74) *Attorney, Agent, or Firm* — Chip Law Group

(57) ABSTRACT

To appropriately prevent a burn-in phenomenon when a still image such as an OSD screen is displayed on a display panel. When a menu screen is displayed on a video screen in a superimposed manner, a menu phrase in at least one of a left-eye video and a right-eye video is deleted on a menu background area. A time period in which a brightness difference between still pixels in a boundary between a menu background area and a menu phrase remains large is reduced, and thus the occurrence of the burn-in phenomenon can be prevented. However, the menu background area is constantly displayed without being deleted, so that screen flickering does not occur.

15 Claims, 11 Drawing Sheets

(51) Int. Cl.
*G09G 3/00* (2006.01)
*G09G 5/14* (2006.01)

(52) U.S. Cl.
CPC ........... *G09G 5/14* (2013.01); *H04N 13/0438* (2013.01); *G02B 2027/014* (2013.01); *G02B 2027/0118* (2013.01); *G02B 2027/0178* (2013.01); *G09G 2320/046* (2013.01)

(58) Field of Classification Search
CPC ........... H04N 1/00798; H04N 13/0497; H04N 13/0011; H04N 13/0018; H04N 13/0438; H04N 13/0452; H04N 13/0022; H04N 13/0456; H04N 13/0029; H04N 13/044; H04N 13/007; H04N 13/004; H04N 9/641; H04N 5/44504; G02B 2027/014; G02B 2027/0178; G02B 27/0149; G02B 2027/0118; G02B 27/017; G09G 3/20; G09G 3/30; G09G 5/00; G09G 3/003; G09G 2320/046; G09G 5/14; G09G 2340/125; G09G 5/39; G09G 5/18; G09G 5/395; H01L 51/50; G06F 90/00; G06F 15/173; G06F 17/30
See application file for complete search history.

(56) References Cited

U.S. PATENT DOCUMENTS

| | | | | |
|---|---|---|---|---|
| 6,377,275 | B1 * | 4/2002 | Kim | G09G 1/165 345/213 |
| 7,965,315 | B2 * | 6/2011 | Jang | G09G 3/20 348/173 |
| 8,054,383 | B2 * | 11/2011 | Lee | G09G 3/007 345/629 |
| 8,334,928 | B2 * | 12/2012 | Huang | H04N 5/44504 348/569 |
| 8,441,585 | B2 * | 5/2013 | Lee | G02B 27/2264 345/8 |
| 8,503,869 | B2 * | 8/2013 | Nakamura | H04N 13/007 386/353 |
| 8,514,273 | B2 * | 8/2013 | Mori | H04N 13/0452 348/14.03 |
| 8,830,150 | B2 * | 9/2014 | Nho | G02B 27/2264 345/82 |
| 8,930,838 | B2 * | 1/2015 | Kang | H04N 13/004 348/51 |
| 2001/0043202 | A1 * | 11/2001 | Choi | G09G 5/18 345/204 |
| 2002/0015029 | A1 * | 2/2002 | Mizushima | H04N 5/44504 345/204 |
| 2005/0156818 | A1 * | 7/2005 | Tsuji | H04N 5/4403 345/26 |
| 2005/0190258 | A1 | 9/2005 | Siegel et al. | |
| 2006/0181646 | A1 * | 8/2006 | Yasuba | H04N 9/641 348/569 |
| 2006/0221210 | A1 * | 10/2006 | Miura | H04N 5/23293 348/239 |
| 2008/0106649 | A1 * | 5/2008 | Prusia | G09G 5/003 348/701 |
| 2008/0170274 | A1 | 7/2008 | Lee | |
| 2008/0177994 | A1 * | 7/2008 | Mayer | G06F 9/4418 713/2 |
| 2010/0045780 | A1 * | 2/2010 | Kwon | H04N 13/0048 348/51 |
| 2010/0074594 | A1 * | 3/2010 | Nakamura | H04N 13/007 386/241 |
| 2011/0018976 | A1 * | 1/2011 | Park | H04N 13/0018 348/51 |
| 2011/0122235 | A1 * | 5/2011 | Lee | H04N 13/0452 348/51 |
| 2011/0193947 | A1 | 8/2011 | Chen | |
| 2011/0255003 | A1 * | 10/2011 | Pontual | H04N 13/004 348/569 |
| 2011/0267425 | A1 * | 11/2011 | Kim | H04N 13/0497 348/43 |
| 2011/0316991 | A1 * | 12/2011 | Mori | H04N 13/0022 348/54 |
| 2013/0182001 | A1 * | 7/2013 | Hwang | G06T 11/00 345/581 |

\* cited by examiner

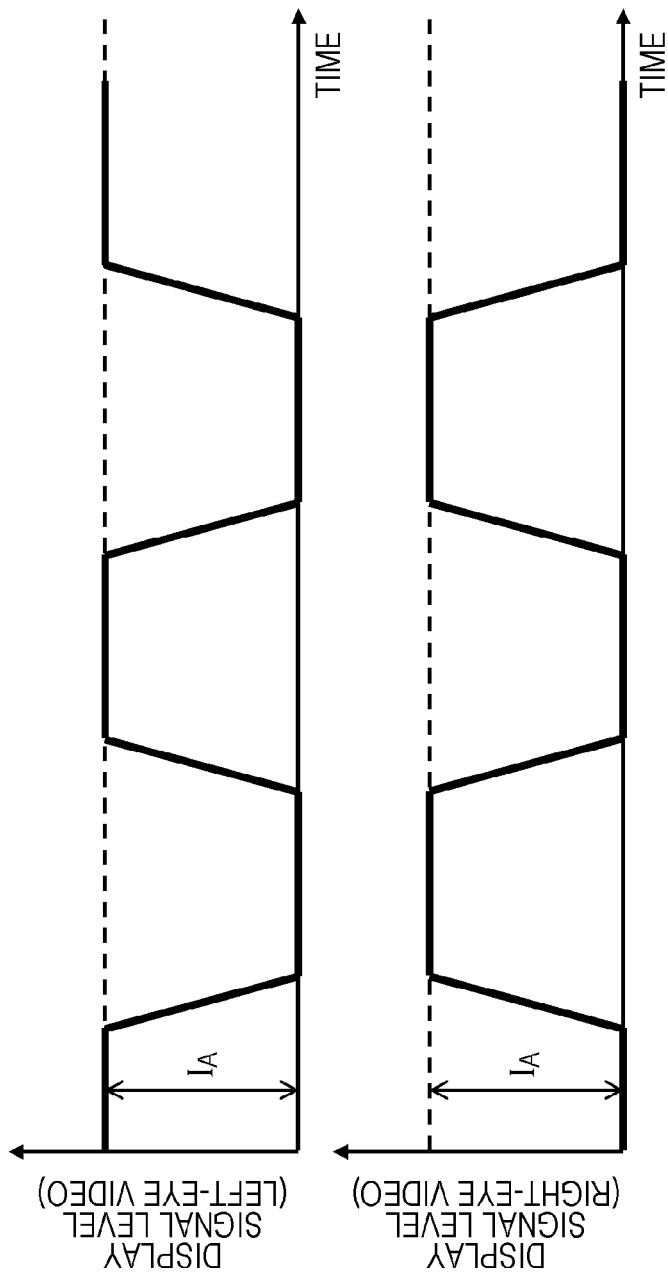

HEAD MOUNT DISPLAY AND DISPLAY CONTROL METHOD

The present application is a national phase entry under 35 U.S.C. §371 of International Application No. PCT/JP2012/005194 filed Aug. 17, 2012, published on Feb. 28, 2013 as WO 2013/027380 A1, which claims priority from Japanese Patent Application No. JP 2011-182323 filed in the Japanese Patent Office on Aug. 24, 2011.

TECHNICAL FIELD

The technology disclosed in this description relates to a head mount display which is mounted on a user's head and used to view a video, and a display control method, and more particularly, to a head mount display and a display control method capable of preventing a burn-in phenomenon when a still image such as an OSD screen is displayed on a display panel.

BACKGROUND ART

A display device that is mounted on the head and used to view a video, that is, a head mount display (HMD) has been widely known. The head mount display includes left-eye and right-eye optical units, and is configured to control a visual sense and an auditory sense in conjunction with a headphone. The head mount display configured to completely block the outside world when mounted on the head implements increased virtual reality while viewing a video. Further, the head mount display can project different videos to the left and right eyes, and can provide a 3D image by displaying an image with parallax between the left and right eyes.

For example, a high-resolution display panel including a liquid crystal element or an organic electro-luminescence (EL) element may be used as left-eye and right-eye display units of a head mount display. Further, when an appropriate angle of view is set by an optical system and a multi-channel is reproduced by a headphone, a realistic sensation like when viewed in a movie theater can be reproduced.

In the industry, a display panel configured with a liquid crystal element, an organic EL element, or the like has been known to be likely to undergo the burn-in phenomenon in an area having a large brightness difference. When a still image such as an on screen display (OSD) screen is rendered to be superimposed on a video screen, an area having a large brightness difference occurs, and thus the burn-in phenomenon occurs in the area.

The head mount display has a limitation to the number of operation buttons mountable to a main body thereof, and thus a user operation using an OSD screen is inevitably required. Thus, even when the display panel of the above-mentioned type is used as the display device of the head mount display, significant consideration needs to be given to prevent the burn-in phenomenon from occurring when an OSD screen is displayed.

For example, an OSD screen used to display a menu includes a menu background area and a menu phrase rendered on the background area. An OSD screen is basically a still image and is likely to have a large brightness difference. For this reason, when an OSD screen is displayed for a long time, the burn-in phenomenon occurs.

A video screen is configured with various video sources such as a moving image, and thus a brightness difference between pixels changes. For this reason, the burn-in phenomenon is reduced to some extent. On the other hand, in a boundary between a menu background area and an area for displaying a menu phrase, when a large brightness difference between still pixels is continued for a long time, the burn-in phenomenon remarkably occurs. Since a menu is often displayed such that the same phrase is repeatedly displayed, the burn-in is easily observed particularly in a boundary portion between the menu background area and a menu phrase.

For example, a liquid crystal display device has been proposed that prevents an afterimage phenomenon, in a state in which display content of the entire screen can be constantly determined, by sequentially moving pixels equally dispersed among pixels configuring a display screen and causing the moved pixels to display black (for example, see Patent Document 1).

Further, an organic light-emitting display device has been proposed that suppresses the burn-in from being observed even when the same image is displayed for a long time by moving a display position of the entire panel by a predetermined distance at predetermined time intervals (for example, see Patent Document 2).

Furthermore, a video display device has been proposed that prevents the burn-in by a process of lowering brightness of an OSD display (for example, see Patent Document 3).

However, in the above-mentioned related arts, it is difficult to prevent the burn-in phenomenon, particularly, in the boundary portion between the menu background area and the menu phrase. Since a video screen on which an OSD screen is not superimposed is configured with various video sources such as a moving image, the video screen is intrinsically unlikely to undergo the burn-in phenomenon. Nevertheless, when a pixel displaying black on a video screen is inserted, a screen of the video screen becomes dark, and the image quality degrades. Further, when the display position of the entire panel is moved by a predetermined distance at predetermined time intervals, the image quality of the video screen degrades, causing complaints to manufacturers. Furthermore, when the brightness of the OSD display is lowered, the OSD screen is not easily visible.

CITATION LIST

Patent Document

Patent Document 1: Japanese Patent Application Laid-Open No. 2009-134188
Patent Document 2: Japanese Patent Application Laid-Open No. 2007-304318
Patent Document 3: Japanese Patent Application Laid-Open No. 2011-81178

SUMMARY

Problems to be Solved

It is an object of the technology disclosed in this description to provide a head mount display and a display control method, which are excellent and capable of appropriately preventing the burn-in phenomenon from occurring when a still image such as an OSD screen is displayed on a display panel.

It is another object of the technology disclosed in this description to provide a head mount display and a display control method, which are excellent and capable of appropriately preventing the burn-in phenomenon, particularly in a boundary portion between a menu background area and a menu phrase when a video, in which an OSD screen including the menu background area and the menu phrase is superimposed on a video screen, is displayed on a display panel.

The present disclosure has been made in light of the above problems, and a technology according to claim 1 provides a display method comprising: displaying an on-screen display image defined by a left-eye video signal and a right-eye video signal, wherein the on-screen display image comprises text and background, and wherein the text is deleted alternately from one of the left-eye video signal and the right-eye video signal.

According to a technology according to claim 1, wherein the text is deleted in response to a user operation.

According to a technology according to claim 1, wherein alternately deleting is performed at predetermined time intervals during a time period in which the on-screen display image is displayed.

According to a technology according to claim 1, wherein each of the left-eye video signal and the right-eye video signal comprises a still image in addition to the on-screen display image.

According to a technology according to claim 1, wherein each of the left-eye video signal and the right-eye video signal comprises a moving image in addition to the on-screen display image.

Further, a technology according to claim 1, wherein the left-eye video signal is communicated to a left-eye display panel of a head mount display, and the right-eye video signal is communicated to a right-eye display panel of the head mount display.

According to a technology claim 7 provides a display method comprising: displaying an on-screen display image defined by a left-eye video signal and a right-eye video signal, wherein the on-screen display image comprises text and background, and wherein the text is thinned relative to the background by alternately reducing a display signal level of the text for one of the left-eye video signal and the right-eye video signal, wherein the display signal level is reduced from a high display signal level, which is below a full display signal level, to a low display signal level.

According to a technology according to claim 7, wherein when a value of the high display signal level is added to a value of the low display signal level, the sum is equal to a value of the full display signal level.

According to a technology claim 9 provides an image display system comprising: at least one control unit for generating an on-screen display image defined by a left-eye video signal and a right-eye video signal, wherein the on-screen display image comprises text and background, and wherein the text is deleted alternately from one of the left-eye video signal and the right-eye video signal;

a left-eye display panel for displaying the left-eye video signal; and a right-eye display panel for displaying the right-eye video signal.

According to a technology according to claim 9, wherein the text is deleted in response to a user operation.

Effects

According to the technology disclosed in this description, it is possible to provide a head mount display and a display control method, which are excellent and capable of appropriately preventing the burn-in phenomenon from occurring when a still image such as an OSD screen is displayed on a display panel.

Further, according to the technology disclosed in this description, it is possible to provide a head mount display and a display control method, which are excellent and capable of appropriately preventing the burn-in phenomenon, particularly in a boundary portion between a menu background area and a menu phrase when a video, in which an OSD screen including the menu background area and the menu phrase is superimposed on a video screen, is displayed on a display panel.

Other objects, features, and advantages of the technology disclosed in this description will become apparent from the detailed description based on embodiments which will be described later and the accompanying drawings.

BRIEF DESCRIPTION OF DRAWINGS

FIG. 7 is a diagram illustrating a timing chart of a display signal level of a menu phrase in each of a left-eye video and a right-eye video when a menu phrase is alternately deleted from one of a left-eye video and a right-eye video at predetermined time intervals.

MODE FOR CARRYING OUT

Hereinafter, embodiments of the technology disclosed in this description will be described in detail with reference to the accompanying drawings.

Figure 1:
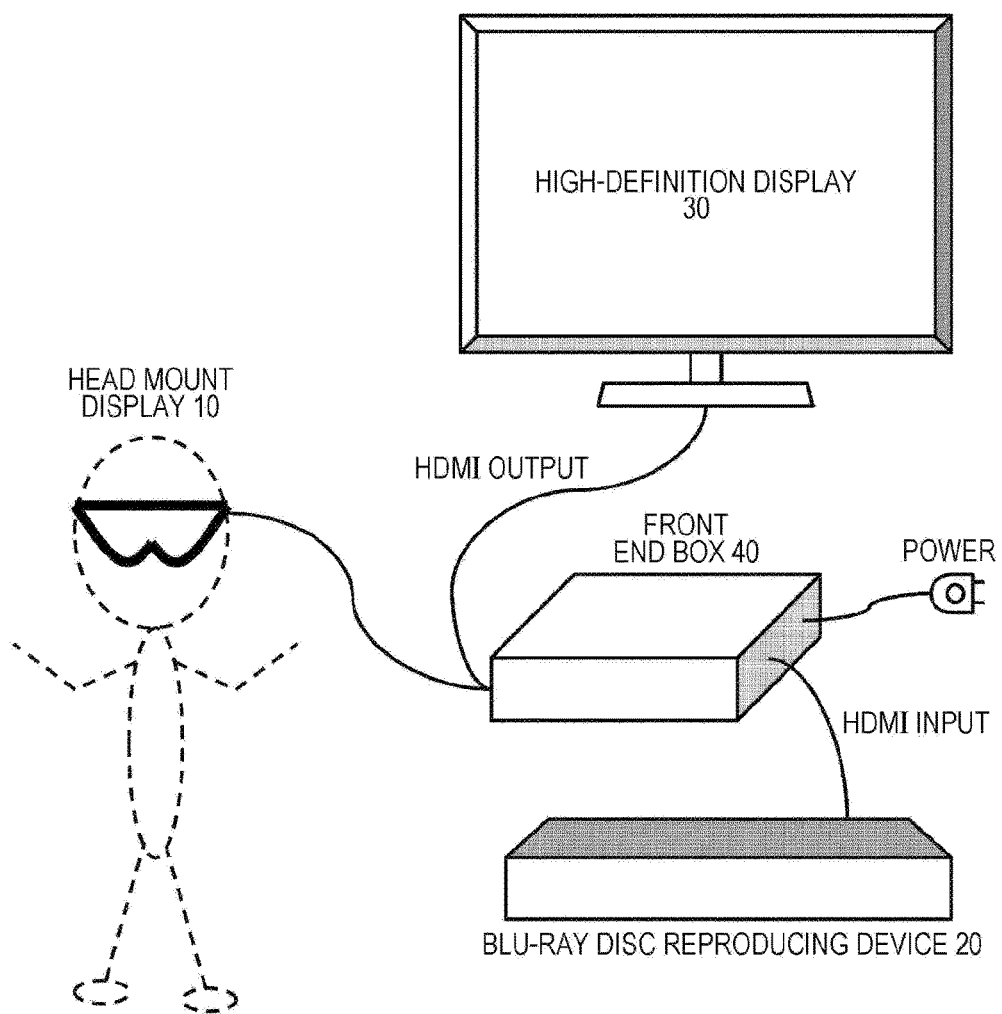
FIG. 1 is a diagram schematically illustrating a configuration of an image display system including a head mount display.

FIG. 1 schematically illustrates a configuration of an image display system including a head mount display. The system illustrated in FIG. 1 includes a main body of the head mount display 10, a Blu-ray disc reproducing device 20 which is a source of viewing content, a high-definition display (for example, a television supporting an HDMI) 30 which is another output destination of reproduction content of the Blu-ray disc reproducing device 20, and a front end box 40 that processes an AV signal output from the Blu-ray disc reproducing device 20.

The front end box 40 corresponds to an HDMI repeater that receives an AV signal output from the Blu-ray disc reproducing device 20 through an HDMI, performs, for example, signal processing, and outputs the signal processing result through an HDMI. The front end box 40 also functions as a two-output switcher that switches an output destination of the Blu-ray disc reproducing device 20 to either the head mount display 10 or the high-definition display 30. In the illustrated example, the front end box 40 has two outputs but may have three or more outputs. The front end box 40 exclusively sets an output destination of an AV signal and gives a priority to an output to the head mount display 10.

The high-definition multimedia interface (HDMI) refers to an interface standard for digital home electronics which is based on a digital visual interface (DVI) and mainly used to transmit a sound and a video. Transition minimized differential signaling (TMDS) is used in a physical layer of the HDMI. For example, the present system conforms to HDMI1.4.

The Blu-ray disc reproducing device 20 is connected to the front end box 40 through an HDMI cable, and the front end box 40 is connected to the high-definition display 30 through an HDMI cable. The front end box 40 can be connected to the head mount display 10 through an HDMI cable, but an AV signal may be serially transferred using any other cable. However, an AV signal and power may be supplied through a single cable that connects the front end box 40 with the head mount display 10, and in this case, the head mount display 10 can be supplied with drive power through this cable.

The head mount display 10 includes left-eye and right-eye display units which are independent of each other. For example, an organic EL element may be used as each display unit. Each of the left and right display units includes a wide viewing angle optical system of a low strain and high resolution.

Figure 2:
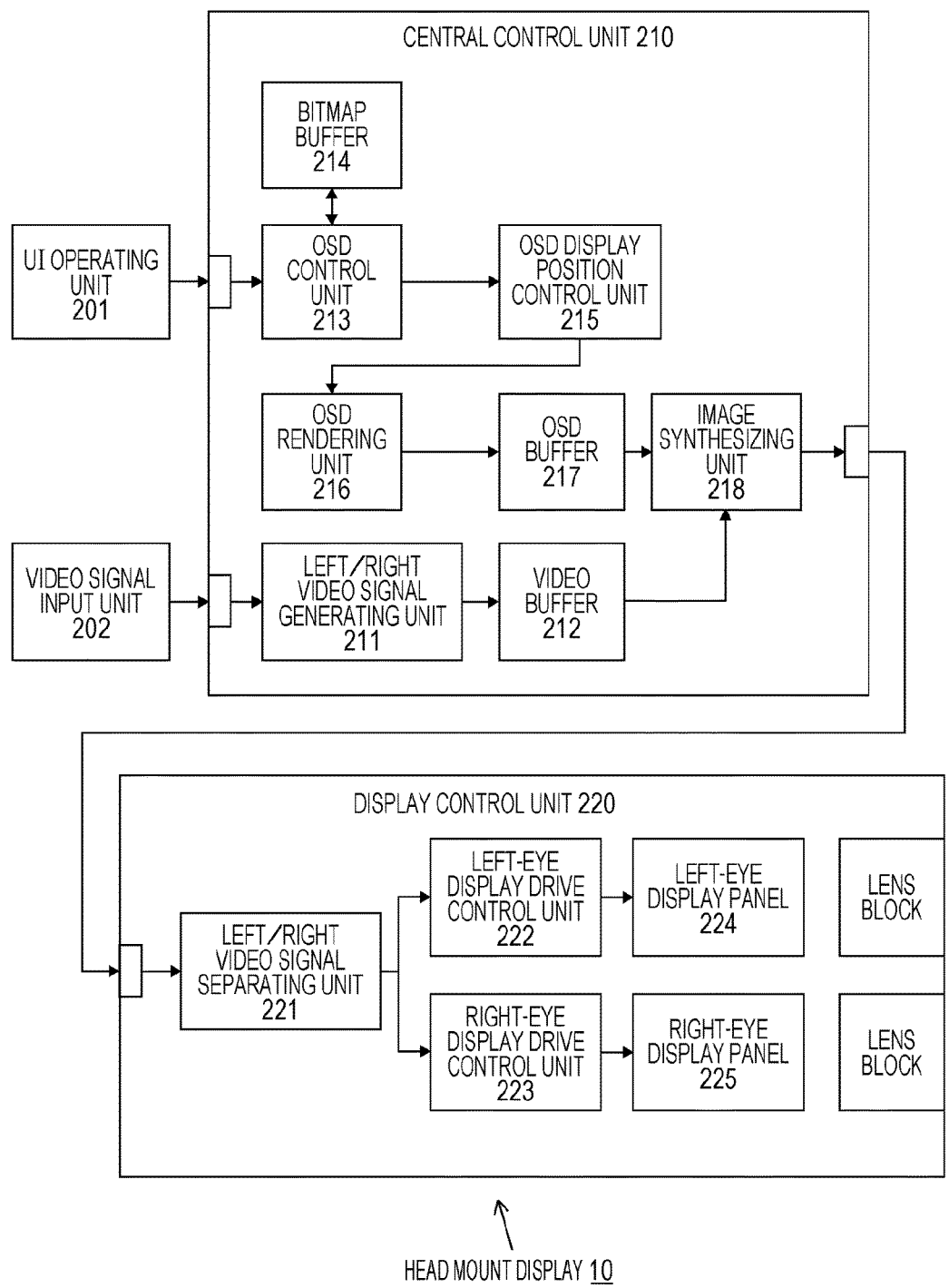
FIG. 2 is a diagram schematically illustrating an internal configuration of a head mount display 10.

FIG. 2 schematically illustrates an internal configuration of the head mount display 10. The head mount display illustrated in FIG. 2 includes a user interface (UI) operating unit 201, a video signal input unit 202, a central control unit 210, and a display control unit 220.

The video signal input unit 202 receives a video signal which is reproduced and output from the Blu-ray disc reproducing device 20 through the front end box 40.

Inside the central control unit 210, a left/right video signal generating unit 211 generates a left/right video signal in which a left-eye video signal is mixed with a right-eye video signal from an input video signal, and writes the left/right video signal in a video buffer 212.

The UI operating unit 201 receives a user's operation made through a button or the like. Inside the central control unit 210, an OSD control unit 213 reads image data of a corresponding menu from a bitmap buffer 214 in response to an UI operation, and generates an OSD screen. An OSD display position control unit 215 controls the display position of the OSD screen, and an OSD rendering unit 216 writes image data of the OSD screen at a corresponding position of an OSD buffer 217. For example, the OSD screen is a menu screen including a menu background area and a menu phrase.

Then, an image synthesizing unit 218 superimposes the OSD screen written in the OSD buffer 217 on the image data written in the video buffer 212, and outputs the resultant data to the display control unit 220.

Inside the display control unit 220, a left/right video signal separating unit 221 first separates an input left/right video signal into a left-eye video signal and a right-eye video signal. Then, a left-eye display drive control unit 222 performs control such that the left-eye video signal is rendered on a left-eye display panel 224. Further, a right-eye display drive control unit 223 performs control such that the right-eye video signal is rendered on a right-eye display panel 225. For example, each of the display panels 224 and 225 may include a display device such as an organic EL element or an LCD. Each of the left-eye display panel 224 and the right-eye display panel 225 includes a lens block that enlarges a video. Each of the left and right lens blocks includes a combination of a plurality of optical lenses and performs optical processing on a video to be displayed on the display panels 224 and 225. A video displayed on a light-emitting surface of each of the display panels 224 and 225 is enlarged while passing through the lens block and then forms a large virtual image on the user's retina. A left-eye video and a right-eye video are fused in the brain of the observing user.

Figure 3:
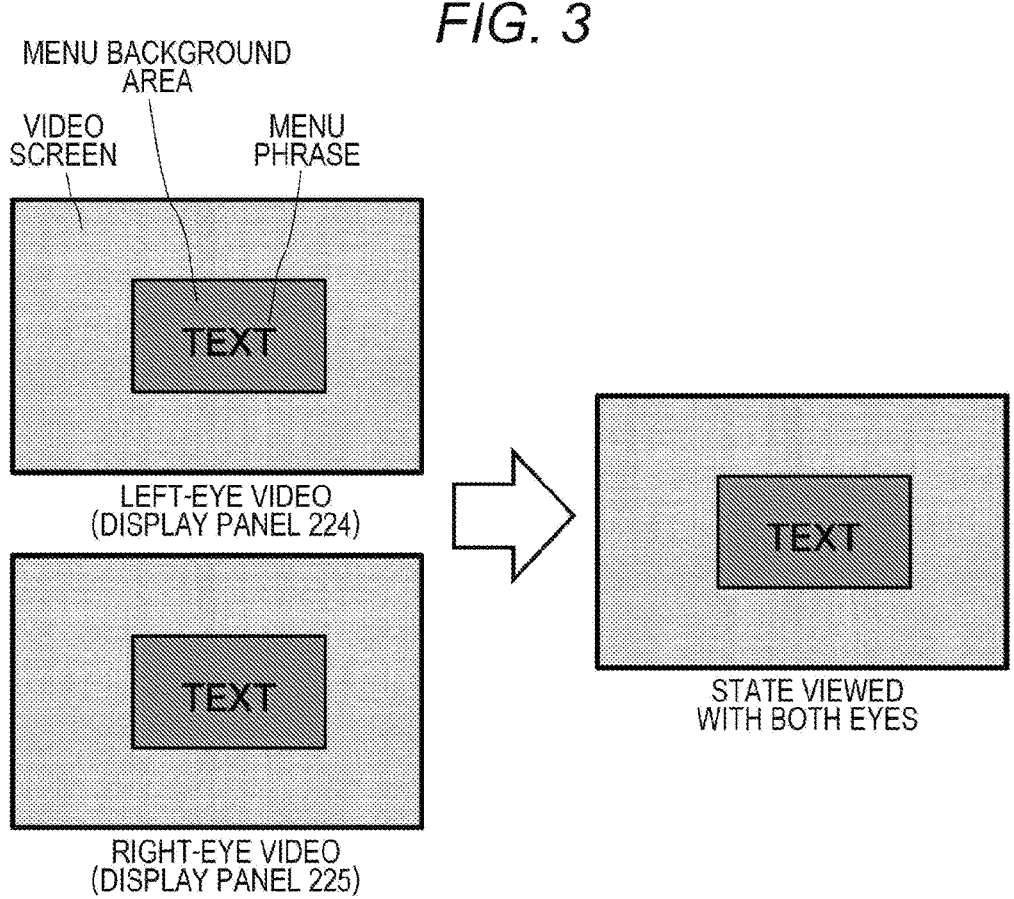
FIG. 3 is a diagram schematically illustrating an aspect in which a left-eye video and a right-eye video respectively displayed on display panels 224 and 225 are viewed with the user's both eyes and then fused in the user's brain.

FIG. 3 schematically illustrates an aspect in which a left-eye video and a right-eye video displayed on the display panels 224 and 225, respectively, are viewed with the user's both eyes, and then fused in the user's brain. In the illustrated example, OSD screens are superimposed on the left-eye video and the right-eye video, respectively, near the center of a video screen. The OSD screen is a menu screen in which a menu phrase (TEXT) is rendered on a menu background area. The menu screens are also fused together with the video screen when viewed with both eyes.

For example, the display panels 224 and 225 include a display device such as an organic EL element or an LCD. However, the display device of this type has a problem in that the burn-in phenomenon is likely to occur in an area having a large brightness difference. For example, when a still image such as the OSD screen is rendered to be superimposed on the video screen, since an area having a large brightness difference is present, the burn-in phenomenon occurs in this area. Particularly, when the OSD screen is a menu screen in which a menu phrase is rendered on a menu background area, a brightness difference between still pixels in a boundary between a menu background area and an area for displaying a menu phrase may remain large for a long time, and thus the burn-in phenomenon may remarkably occur. Meanwhile, the video screen itself, on which the OSD screen is to be superimposed, is configured with various video sources such as a moving image and thus changes in a brightness difference between pixels. For this reason, the burn-in phenomenon is reduced to some extent.

Figure 4:
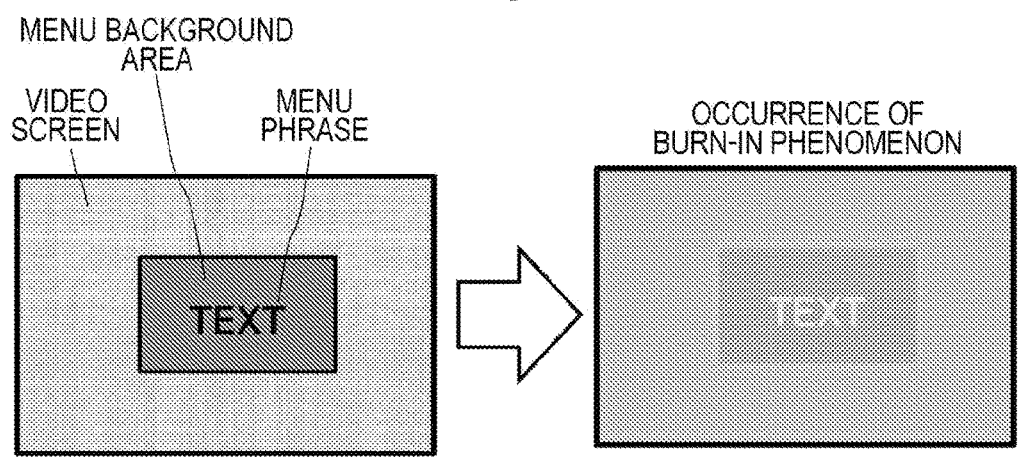
FIG. 4 is a diagram illustrating an aspect in which a burn-in phenomenon occurs in a display panel that displays a video screen on which a menu screen in which a menu phrase is rendered on a menu background area is superimposed.

FIG. 4 illustrates an aspect in which the burn-in phenomenon occurs in a display panel that displays a video screen on which a menu screen in which a menu phrase is rendered on a menu background area is superimposed. As illustrated in the right of FIG. 4, the burn-in phenomenon is remarkably observed in a boundary between a menu background area and a menu phrase.

In this regard, in the technology disclosed in this description, when a video screen on which a menu screen is superimposed is displayed by the head mount display 10, a menu phrase in at least one of a left-eye video and a right-eye video is thinned and then displayed on a menu background area. As a result, a time period in which a brightness difference between still pixels in a boundary between the menu background area and the menu phrase remains large is reduced, and thus the occurrence of the burn-in phenomenon can be prevented.

The video screen is configured with various video sources such as a moving image and changes in a brightness difference between pixels. Thus, the video screen is unlikely to undergo the burn-in phenomenon, and for this reason, the video screen is displayed without being thinned. Further, the menu background area is continuously displayed without being thinned together with the menu phrase. This is because flickering occurs when a display and a non-display are alternately switched even in the menu background area that occupies a relatively large area in the screen.

Figure 5:
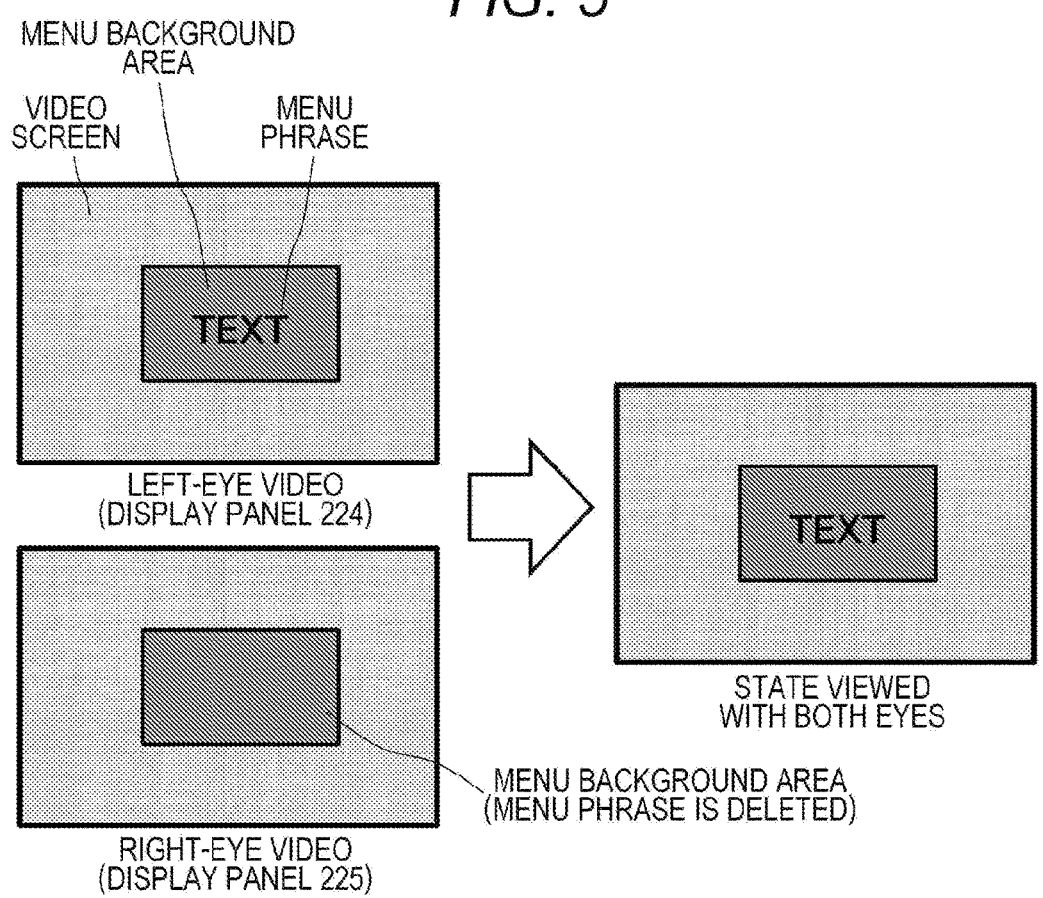
FIG. 5 is a diagram schematically illustrating an aspect in which video screens on which a menu screen that thins and displays a menu phrase is superimposed are displayed and then are fused in the brain of the user who views the video screens with both eyes.

FIG. 5 schematically illustrates an aspect in which video screens on which a menu screen that thins and displays a menu phrase is superimposed are displayed on the display panels 224 and 225 and then are fused in the brain of the user who views the video screens with both eyes. In the illustrated example, a menu screen on which a menu phrase is rendered is superimposed near the screen center of a left-eye video, whereas only a menu background area is displayed near the center of a right-eye video, and a display of a menu phrase is deleted from the menu screen. The video screen and the menu background area are common to the left-eye video and the right-eye video. In a state in which the left-eye and right-eye videos are viewed with both eyes, the menu screens are also fused together with the video screens, and thus the menu phrase is almost normally viewed.

Figure 6A:
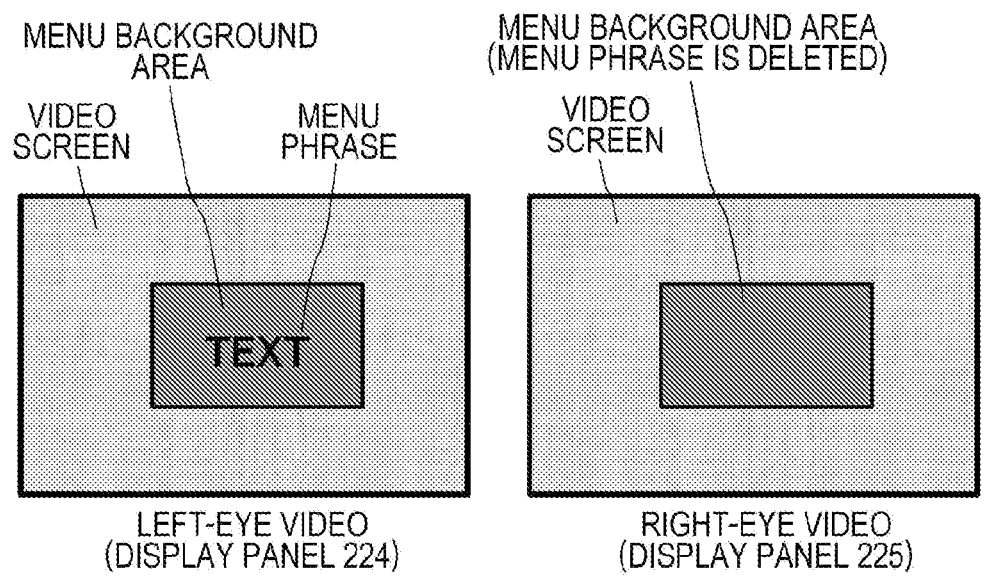
FIG. 6A is a diagram illustrating an aspect in which a menu phrase is alternately displayed on a menu screen in one of a left-eye video and a right-eye video.

FIG. 6A is a diagram illustrating an aspect in which a left-eye video in which a menu screen on which a menu phrase is rendered on a menu background area is superimposed near the center of a video screen is displayed at the same time as a right-eye video in which a menu screen including only a menu background area in which a menu phrase is thinned is superimposed near the center of a video screen. The video screen and the menu background area are common to the left-eye video and the right-eye video.

Figure 6B:
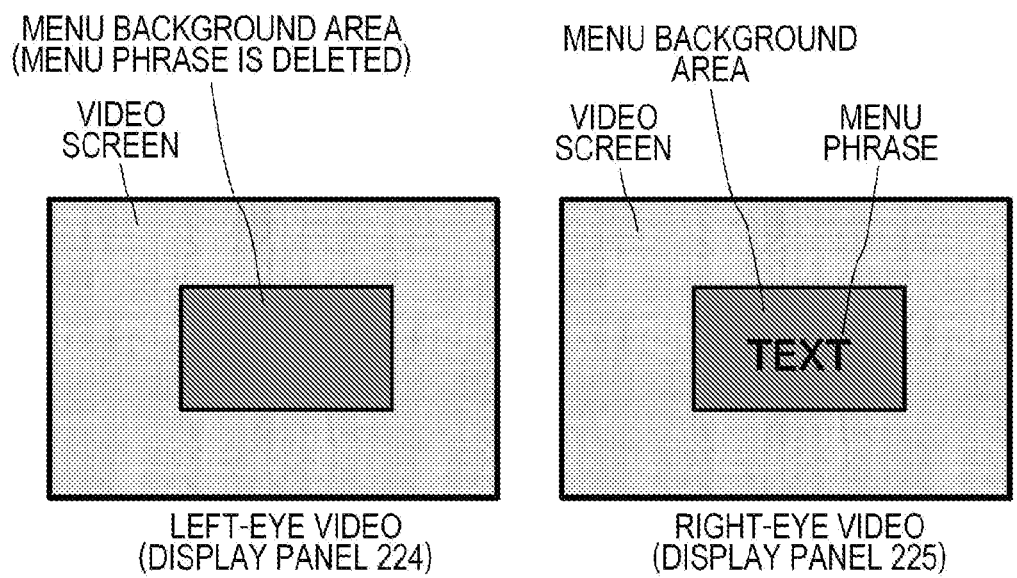
FIG. 6B is a diagram illustrating an aspect in which a menu phrase is alternately displayed on a menu screen in one of a left-eye video and a right-eye video.

FIG. 6B is a diagram illustrating an aspect in which a left-eye video in which a menu screen including only a menu background area in which a menu phrase is thinned is superimposed near the center of a video screen is displayed at the same time as a right-eye video in which a menu screen on which a menu phrase is rendered on a menu background area is superimposed near the center of a video screen. The video screen and the menu background area are common to the left-eye video and the right-eye video.

In a state in which the left and right videos of either of FIGS. 6A and 6B are displayed and viewed with both eyes, the menu screens are also fused together with the video screens, and thus the menu phrase is almost normally viewed. When video displays of FIGS. 6A and 6B are alternately repeated, duty ratios at which the menu phrase is displayed on the menu background in the left and right display panels 224 and 225 are 50%, respectively. Thus, degradation of the display panels 224 and 225 caused by the burn-in of the OSD screen display can be prevented by about 50%.

There are several display methods of thinning the menu phrase from the menu screen in the left and right videos. Here, several methods of thinning a menu phrase are introduced.

Display Method 1

As described above, an OSD screen display process is activated in response to the user's UI operation on the UI operating unit 201. A method of switching a display and a non-display of a menu phrase using the user's operation on the UI operating unit 201 as a trigger is considered as a first example of a display method of thinning a menu phrase. In other words, a menu phrase is alternately deleted from one of a left-eye video and a right-eye video each time the UI operating unit 201 is operated.

When the UI operating unit 201 is operated and thus a corresponding menu screen is displayed, a menu phrase is first displayed only on the left-eye video as illustrated in FIG. 6A.

Then, when an operation such as menu selection is performed by the UI operating unit 201, the menu screens are deleted from both the left-eye video and right-eye video in response to the fact that a specification of a menu ends (not illustrated).

Subsequently, when the UI operating unit 201 is operated and thus a corresponding menu screen is displayed, a menu phrase is displayed only on the right-eye video in turn as illustrated in FIG. 6B.

Display Method 2

Next, a method of alternately deleting a menu phrase from one of a left-eye video and a right-eye video at predetermined time intervals during a time period in which an OSD screen is displayed will be described. This method is a method of switching a video displaying a menu phrase at predetermined time intervals.

FIG. 7 illustrates a timing chart of a display signal level of a menu phrase in each of a left-eye video and a right-eye video when a menu phrase is alternately deleted from one of a left-eye video and a right-eye video at predetermined time intervals. During a display time period of the menu phrase, a display signal level (current) is set to $I_A$, and during a time period in which the menu phrase is deleted, a display signal level is set to 0.

In this case, a display of the left and right videos illustrated in FIG. 6A and a display of the left and right videos illustrated in FIG. 6B are alternately repeated at predetermined time intervals.

Display Method 3

Next, a method of alternately repeating a display and a non-display of menu phrases in a left-eye video and a right-eye video at predetermined time intervals during a time period in which an OSD screen is displayed will be described. Unlike the display method 2, switching operations between a display and a non-display of the menu phrases in the left-eye video and the right-eye video are performed at the same time.

Figure 8A:
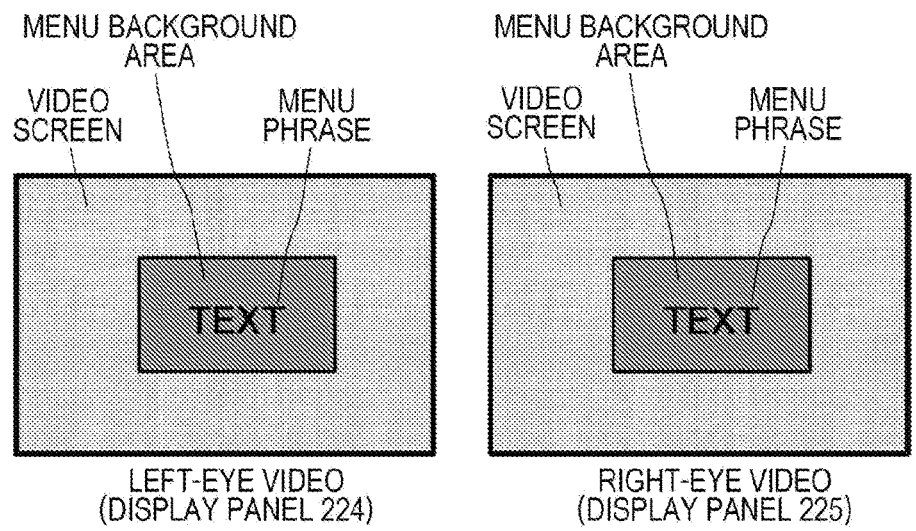
FIG. 8A is a diagram illustrating an aspect in which menu phrases are displayed on menu screens of both a left-eye video and a right-eye video.
Figure 8B:
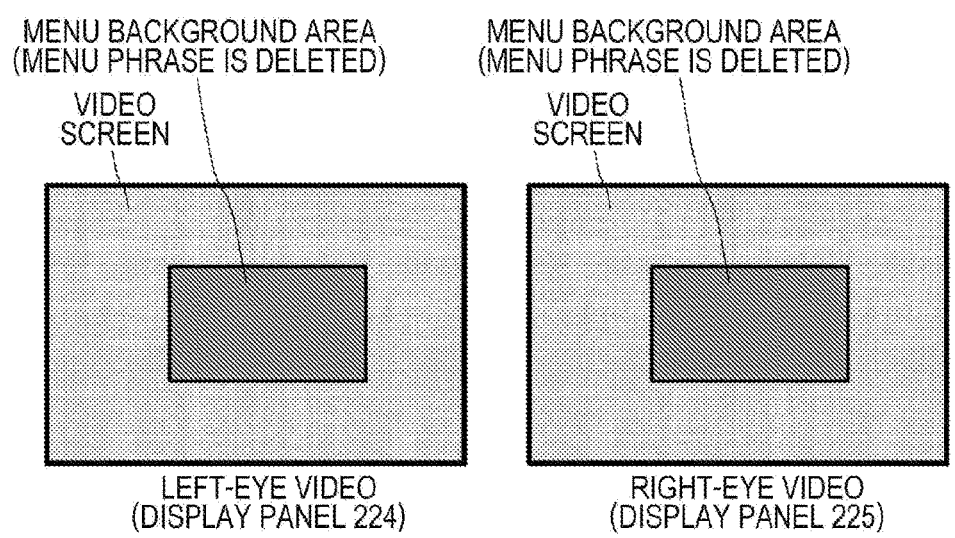
FIG. 8B is a diagram illustrating an aspect in which menu phrases are deleted from menu screens of both a left-eye video and a right-eye video and thus only menu background areas are displayed.
Figure 9:
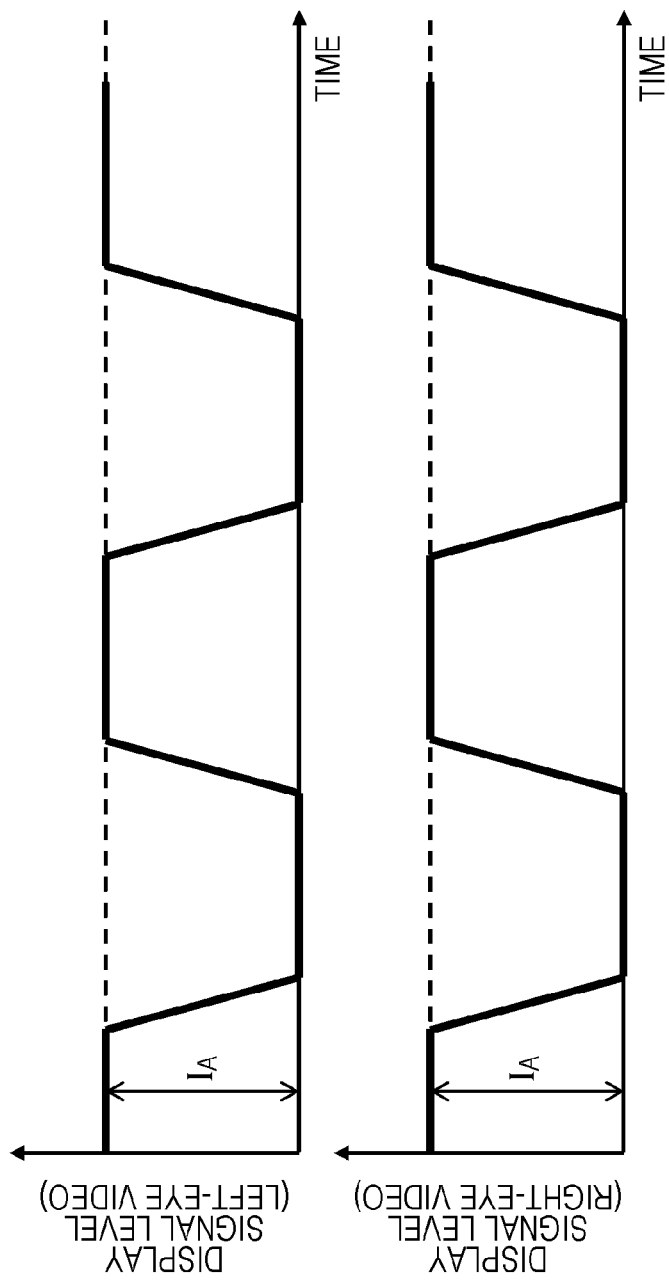
FIG. 9 is a timing chart of a display signal level of a menu phrase in each of a left-eye video and a right-eye video when a display and a non-display of menu phrases in a left-eye video and a right-eye video are alternately repeated at predetermined time intervals during a time period in which an OSD screen is displayed.

FIG. 8A illustrates an aspect in which menu phrases are displayed on menu screens of both a left-eye video and a right-eye video. FIG. 8B illustrates an aspect in which menu phrases are deleted from menu screens of both a left-eye video and a right-eye video and thus only menu background areas are displayed. FIG. 9 illustrates a timing chart of a display signal level of a menu phrase in each of a left-eye video and a right-eye video when a display and a non-display of menu phrases in a left-eye video and a right-eye video are alternately repeated at predetermined time intervals during a time period in which an OSD screen is displayed.

Display Method 4

A method of alternately switching display signals of strong and weak levels of menu phrases in a left-eye video and a right-eye video at predetermined time intervals during a time period in which an OSD screen is displayed will be described.

Figure 10:
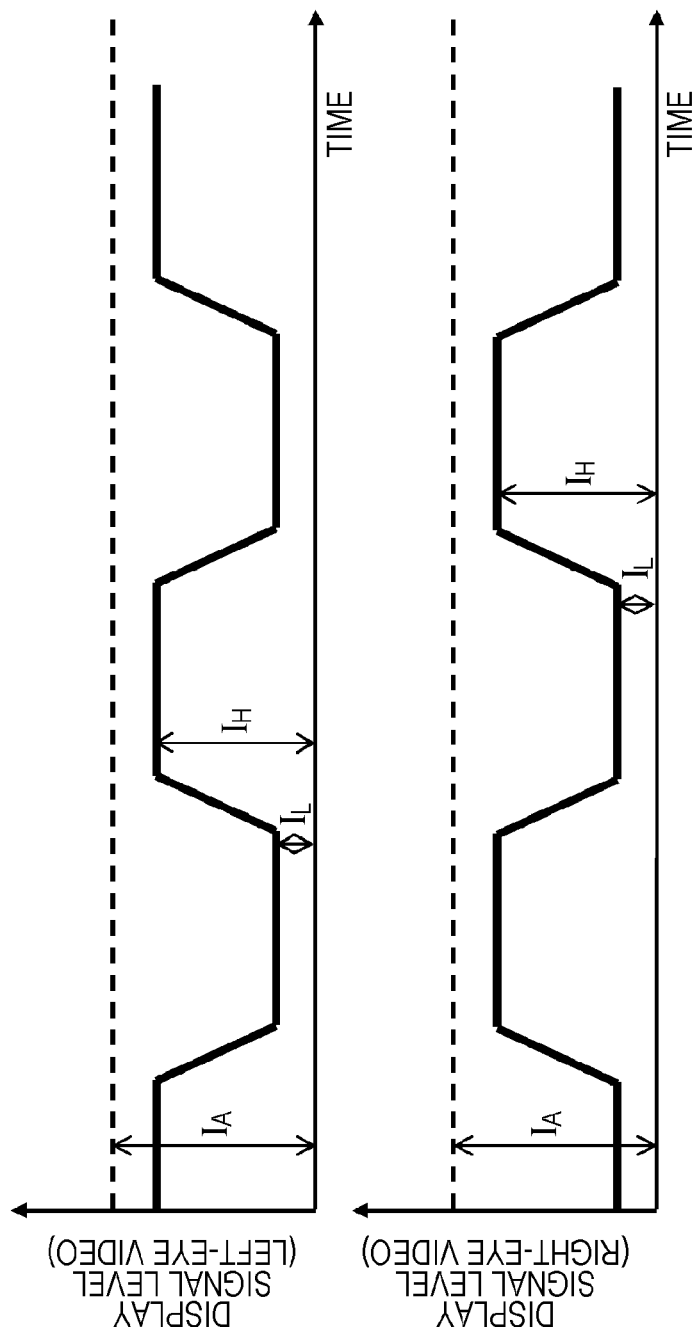
FIG. 10 is a timing chart of a display signal level of a menu phrase in each of a left-eye video and a right-eye video when display signals of strong and weak levels of menu phrases in a left-eye video and a right-eye video are alternately switched at predetermined time intervals during a time period in which an OSD screen is displayed.

FIG. 10 illustrates a timing chart of a display signal level of a menu phrase in each of a left-eye video and a right-eye video when display signals of strong and weak levels of menu phrases in a left-eye video and a right-eye video are alternately switched at predetermined time intervals during a time period in which an OSD screen is displayed.

In this method, under the assumption that a display signal level (current) when a menu phrase is fully displayed is $I_A$, a value of a high display signal level of a menu phrase is set to $I_H$ lower than $I_A$, and a value of a low display signal level of a menu phrase is set to $I_L$ higher than 0, so that a relation of "$I_A=I_H+I_L$" is established. In this case, a menu phrase is displayed with either of the display signal levels $I_H$ and $I_L$ in each of a left-eye video and a right-eye video, and thus a menu phrase is displayed darker than when a menu phrase is displayed in any one video with the display signal level $I_A$. However, when the display signal level of the menu phrase in the left-eye video is added to the display signal level of the menu phrase in the right-eye video, the resultant display signal level is constantly $I_A=I_H+I_L$. Thus, the left-eye video and the right-eye video are fused in the brain of the observing user, and thus the menu phrase is expected to be viewed at desired brightness.

The technology disclosed in this description may have the following configurations.

(1) A display method comprising: displaying an on-screen display image defined by a left-eye video signal and a right-eye video signal, wherein the on-screen display image comprises text and background, and wherein the text is deleted alternately from one of the left-eye video signal and the right-eye video signal.

(2) The method of (1), wherein the text is deleted in response to a user operation.

(3) The method of (1), wherein alternately deleting is performed at predetermined time intervals during a time period in which the on-screen display image is displayed.

(4) The method of (1), wherein each of the left-eye video signal and the right-eye video signal comprises a still image in addition to the on-screen display image.

(5) The method of (1), wherein each of the left-eye video signal and the right-eye video signal comprises a moving image in addition to the on-screen display image.

(6) The method (1), wherein the left-eye video signal is communicated to a left-eye display panel of a head mount display, and the right-eye video signal is communicated to a right-eye display panel of the head mount display.

(7) A display method comprising:
displaying an on-screen display image defined by a left-eye video signal and a right-eye video signal, wherein the on-screen display image comprises text and background, and wherein the text is thinned relative to the background by alternately reducing a display signal level of the text for one of the left-eye video signal and the right-eye video signal, wherein the display signal level is reduced from a high display signal level, which is below a full display signal level, to a low display signal level.

(8) The method of (7), wherein when a value of the high display signal level is added to a value of the low display signal level, the sum is equal to a value of the full display signal level.

(9) An image display system comprising:
at least one control unit for generating an on-screen display image defined by a left-eye video signal and a right-eye video signal, wherein the on-screen display image comprises text and background, and wherein the text is deleted alternately from one of the left-eye video signal and the right-eye video signal;
a left-eye display panel for displaying the left-eye video signal; and
a right-eye display panel for displaying the right-eye video signal.

(10) The system of (9), wherein the text is deleted in response to a user operation.

(11) The system of (9), wherein alternately deleting is performed at predetermined time intervals during a time period in which the on-screen display image is displayed.

(12) The system of (9), wherein the display control unit, the left-eye display panel, and the right-eye display panel are included within a head mount display.

(13) An image display system comprising:
at least one control unit for generating an on-screen display image defined by a left-eye video signal and a right-eye video signal, wherein the on-screen display image comprises text and background, and wherein the text is thinned relative to the background by alternately reducing a display signal level of the text for one of the left-eye video signal and the right-eye video signal, wherein the display signal level is reduced from a high display signal level, which is below a full display signal level, to a low display signal level;
a left-eye display panel for displaying the left-eye video signal; and
a right-eye display panel for displaying the right-eye video signal.

(14) The system of (13), wherein when a value of the high display signal level is added to a value of the low display signal level, the sum is equal to a value of the full display signal level.

(15) The system of (13), wherein the display control unit, the left-eye display panel, and the right-eye display panel are included within a head mount display.

(16) A non-transitory computer-readable medium having stored thereon a computer readable program for implementing a display method, the display method comprising:
displaying an on-screen display image defined by a left-eye video signal and a right-eye video signal, wherein the on-screen display image comprises text and background, and wherein the text is deleted alternately from one of the left-eye video signal and the right-eye video signal.

(17) A non-transitory computer-readable medium having stored thereon a computer readable program for implementing a display method, the display method comprising:
displaying an on-screen display image defined by a left-eye video signal and a right-eye video signal, wherein the on-screen display image comprises text and background, and wherein the text is thinned relative to the background by alternately reducing a display signal level of the text for one of the left-eye video signal and the right-eye video signal, wherein the display signal level is reduced from a high display signal level, which is below a full display signal level, to a low display signal level.

INDUSTRIAL APPLICABILITY

The technology disclosed in this description has been described above in detail with reference to the specific embodiments. However, it is obvious that those skilled in the art can make modification or substitution of the embodiments in a range not departing from the gist of the technology disclosed in this description.

In this description, the technology disclosed in this description has been described in connection with the embodiments to which the head mount display is applied. However, the gist of the technology disclosed in this description is not limited to a configuration of a specific head mount display. The technology disclosed in this description can be similarly applied to display systems of various types capable of displaying a left-eye video and a right-eye video or a plurality of videos at the same time. Further, a device that displays a video is not limited to an LCD or an organic EL element, and the technology disclosed in this description is effective even on various display devices which are likely to undergo the burn-in phenomenon in an area having a large brightness difference.

In short, the technology disclosed in this description has been described by way of illustration, and thus the content described in this description is not to be interpreted as a limitation. It is necessary to take claims into consideration in order to determine the gist of the technology disclosed in this description.

REFERENCE SIGNS LIST

10 Head mount display
20 Blu-ray disc reproducing device
30 High-definition display
40 Front end box
201 UI operating unit
202 Video signal input unit
210 Central control unit
211 Left/right video signal generating unit
212 Video buffer
213 OSD control unit
214 Bitmap buffer
215 OSD display position control unit
216 OSD rendering unit
217 OSD buffer
218 Image synthesizing unit
220 Display control unit
221 Left/right video signal separating unit
222 Left-eye display drive control unit
223 Right-eye display drive control unit
224 Left-eye display panel
225 Right-eye display panel

The invention claimed is:

1. A display method, comprising:
  displaying an on-screen display image defined by a left-eye video and a right-eye video, wherein the on-screen display image comprises text and background; and
  deleting the text alternately from one of the left-eye video or the right-eye video,
    wherein the text in each of the left-eye video and the right-eye video are alternately deleted at time intervals in a time period in which the background of the on-screen display image is displayed.

2. The display method as recited in claim 1, wherein the text is deleted based on a user operation.

3. The display method as recited in claim 1, wherein each of the left-eye video and the right-eye video comprises a still image in addition to the on-screen display image.

4. The display method as recited in claim 1, wherein each of the left-eye video and the right-eye video comprises a moving image in addition to the on-screen display image.

5. The display method as recited in claim 1, wherein the left-eye video is communicated to a left-eye display panel of a head mount display, and the right-eye video is communicated to a right-eye display panel of the head mount display.

6. A display method, comprising:
  displaying an on-screen display image defined by a left-eye video and a right-eye video, wherein the on-screen display image comprises text and background; and
  thinning the text relative to the background by alternately reducing a display signal level of the text for one of the left-eye video or the right-eye video,
    wherein the display signal level of the text, of the displayed on-screen display image, in each of the left-eye video and the right-eye video are alternately reduced at a time period in which the on-screen display image is displayed,
    wherein the display signal level is reduced from a first display signal level, which is below a full display signal level, to a second display signal level, and
    wherein the display signal level is a current level.

7. The display method as recited in claim 6, wherein a sum of a value of the first display signal level and a value of the second display signal level is equal to a value of the full display signal level.

8. An image display system, comprising:
  a left-eye display panel configured to display a left-eye video;
  a right-eye display panel configured to display a right-eye video; and
  at least one control unit configured to:
    generate an on-screen display image defined by the left-eye video and the right-eye video, wherein the on-screen display image comprises text and background; and
    delete the text alternately from one of the left-eye video or the right-eye video,
      wherein the text in each of the left-eye video and the right-eye video are alternately deleted at time intervals in a time period in which the background of the on-screen display image is displayed.

9. The image display system as recited in claim 8, wherein the text is deleted based on a user operation.

10. The image display system as recited in claim 8, wherein the at least one control unit, the left-eye display panel, and the right-eye display panel are included within a head mount display.

11. An image display system, comprising:
  a left-eye display panel configured to display a left-eye video;
  a right-eye display panel configured to display a right-eye video; and
  at least one control unit configured to:
    generate an on-screen display image defined by the left-eye video and the right-eye video, wherein the on-screen display image comprises text and background; and
    thin the text relative to the background by alternate reduction of a display signal level of the text for one of the left-eye video or the right-eye video,
      wherein the display signal level of the text, of the displayed on-screen display image, in each of the left-eye video and the right-eye video are alternately reduced at a time period in which the on-screen display image is displayed,
      wherein the display signal level is reduced from a first display signal level, which is below a full display signal level, to a second display signal level, and
      wherein the display signal level is a current level.

12. The image display system as recited in claim 11, wherein a sum of a value of the first display signal level and a value of the second display signal level is equal to a value of the full display signal level.

13. The image display system as recited in claim 11, wherein the at least one control unit, the left-eye display panel, and the right-eye display panel are included within a head mount display.

14. A non-transitory computer-readable medium having stored thereon computer-executable instructions that, when executed by a processor, cause a computer to execute operations, the operations comprising:
- displaying an on-screen display image defined by a left-eye video and a right-eye video, wherein the on-screen display image comprises text and background; and
- deleting the text alternately from one of the left-eye video or the right-eye video,
  - wherein the text in each of the left-eye video and the right-eye video are alternately deleted at time intervals in a time period in which the background of the on-screen display image is displayed.

15. A non-transitory computer-readable medium having stored thereon computer-executable instructions that, when executed by a processor, cause a computer to execute operations, the operations comprising:
- displaying an on-screen display image defined by a left-eye video and a right-eye video, wherein the on-screen display image comprises text and background; and
- thinning the text relative to the background by alternately reducing a display signal level of the text for one of the left-eye video or the right-eye video,
- wherein the display signal level of the text, of the displayed on-screen display image, in each of the left-eye video and the right-eye video are alternately reduced at a time period in which the on-screen display image is displayed,
- wherein the display signal level is reduced from a first display signal level, which is below a full display signal level, to a second display signal level, and
- wherein the display signal level is a current level.

\* \* \* \* \*